United States Patent [19]

Kloots

[11] 4,082,422
[45] Apr. 4, 1978

[54] STRAIN-RELIEVED FIBEROPTIC CABLE

[75] Inventor: Jacobus Kloots, Sturbridge, Mass.

[73] Assignee: Applied Fiberoptics, Inc., Southbridge, Mass.

[21] Appl. No.: 697,847

[22] Filed: Jun. 21, 1976

[51] Int. Cl.² .............................................. G02B 5/16
[52] U.S. Cl. .............................. 350/96.23; 350/96.24; 339/101
[58] Field of Search .......................... 350/96 B, 96 C; 174/135; 339/101; 138/109

[56] References Cited

U.S. PATENT DOCUMENTS

| 3,285,242 | 11/1966 | Wallace | 350/96 B |
| 3,357,423 | 12/1967 | Winchester et al. | 350/96 B |
| 3,993,837 | 12/1976 | Bowen et al. | 350/96 C |

Primary Examiner—John K. Corbin
Assistant Examiner—Rolf Hille
Attorney, Agent, or Firm—Thomas N. Tarrant

[57] ABSTRACT

A fiberoptic cable having a strain-relieved terminal end in which a length of elastomeric material is bonded to and covers the cable sheath to prevent sharp bending adjacent the terminal and a sleeve is mechanically fitted inside a rigid plastic terminal housing as an adhesive bonding adapter between said sheath and said housing.

7 Claims, 2 Drawing Figures

STRAIN-RELIEVED FIBEROPTIC CABLE

BACKGROUND OF THE INVENTION

1. Field of the Invention

The present invention relates to cables of fibrous or stranded material and in particular to terminal ends of such cables that are assembled with strain relief reinforcement to reduce fracture damage to individual fibers or strands from excessive flexing.

2. Description of the Prior Art

A cable, and especially a plug-in cable that is frequently manipulated, suffers a good deal of flexing and related abuse adjacent to the point of termination. Electric appliance cords as well as optical cables commonly utilize some additional support adjacent terminal ends to improve reliability and longevity. In cables where the end termination is a rigid material, the transition from the elastic material to the rigid termination is particularly vulnerable to deterioration. Separation between the elastic support and the rigid termination results in severe stress on the cable at the point of such separation. Both mechanical and adhesive bonding approaches have been utilized with various degrees of success in preventing such separation. Adhesives that work well with the rigid material frequently provide poor adhesion to the elastic support material or the cable sheath.

SUMMARY OF THE INVENTION

Now, in accordance with the present invention, it has been found that an adapter sleeve inserted between the hard rigid material of a termination housing and an elastomeric cable sheath may be mechanically fastened to the housing and permits strong adhesive bonding to an elastomeric cable sheath or support tube. By overlapping an elastomeric cable sheath and an elastomeric strain-relief tube with a sleeve all adhesively bonded to each other and mechanically securing the sleeve to a rigid plastic housing, an integral termination is provided. Thus it is an object of the invention to provide a novel strain-relieved terminal end for a flexible cable.

A further object of the invention is a method of providing a strain-relieved terminal end to a flexible cable.

It is still a further object of the invention to provide a novel fiberoptic cable with strain-relieved termination.

Further objects and features of the invention will become apparent upon reading the following description together with the drawing.

DESCRIPTION OF THE PREFERRED EMBODIMENT

The present invention is used with light conducting cables composed of a multitude of tiny fragile optical fibers. The small diameter of the individual fibers gives them great flexibility, but a sharp bend will fracture one of the fibers. The fibers are commonly separate from each other through the length of the cable, but are bonded tightly together at the termination and ground to an optical finish.

Figure 1:
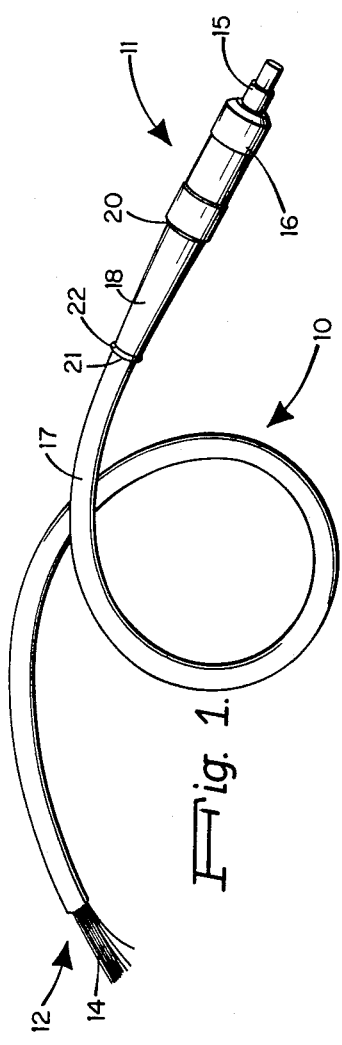
FIG. 1 is a perspective view of a fiberoptic cable according to the invention.

FIG. 1 depicts fiberoptic cable 10 terminated in accordance with the invention at end 11 and unterminated at end 12 to show optical fibers 14. End 11 shows a particular coupling element 15 for plug-in purposes. Element 15 may be replaced by any other desired end fitting and is not relevant to the invention. Element 15 is supported in the end of housing 16. Housing 16 is depicted as a cylindrical plastic casing around end 15. Housing 16 has been made from thermoplastic resins such as acetal plastics and is preferably a hard rigid dielectric material. Housing 16 is both a termination support structure and a means for handling. Thus housing 16 is conveniently 3 to 10 centimeters in length for gripping by hand. The diameter of housing 16 varies with the diameter of cable 10 and the requirements of element 15 or other end fitting.

Figure 2:
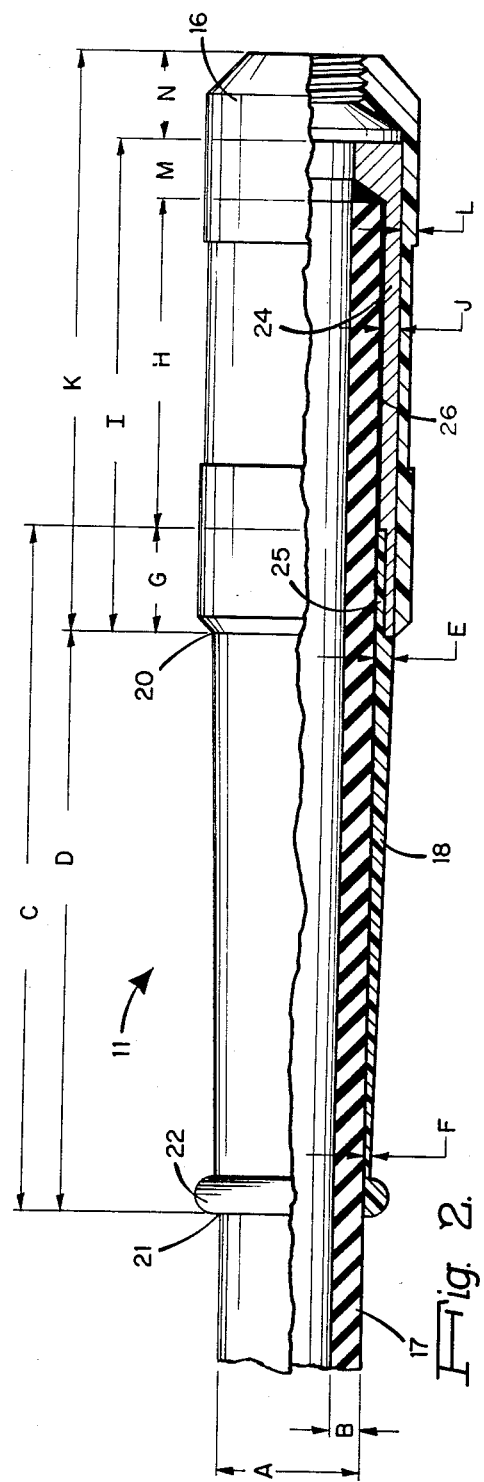
FIG. 2 is a view of the terminal end of the cable of FIG. 1 partially in section.

Fibers 14 are encased in a sheath 17 of an elastomeric material such as rubber. Sheath 17 extends inside housing 16 as can be seen in FIG. 2. Covering a short portion of sheath 17 and also extending inside housing 16 is strain-reliever 18 also made of an elastomeric material. While sheath 17 may be extruded with an unvarying wall thickness, strain-reliever 18 is preferably molded with a thickness greater at juncture 20 with housing 16 and then tapering to juncture 21 with sheath 17. In the depicted embodiment, there is a thickened terminating ridge right at juncture 21 which is primarily a matter of cosmetics and not essential. The details of end 11 are more clearly depicted in the partial cross-section of FIG. 2.

Housing 16 has a metal sleeve 24 press-fit inside it. Sleeve 24 has been made of aluminum or alternatively stainless steel dimensioned so that it is retained securely by press-fitting. Sleeve 24 is not necessarily metal, but must be a material that can be mechanically secured in housing 16 and can be securely bonded to the elastomeric materials of 17 and 18 by available adhesives. It is contemplated also to mold housing 16 with ridges, grooves or projections to engage or otherwise capture sleeve 24 so as to secure it other than by press-fitting alone. The inside diameter of sleeve 24 is large enough to freely admit sheath 17. Short extension 25 of strain-reliever 18 extending beyond juncture 20 has a reduced thickness so that it also fits inside sleeve 24 on top of sheath 17.

In assembly a bonding adhesive 26 is applied to sheath 17 over the length from where juncture 21 will be positioned to its termination at end 11. Bonding adhesive 26 is also applied to the outer surface of strain-reliever 18 over extension 25. In order to fill in voids without shrinkage and provide a good adhesive bond to both the metal of sleeve 24 and the elastomeric materials of sheath 17 and strain-reliever 18, an epoxy resin has been found desirable. An exemplary configuration of the termination assembly at end 11 is given below:

EXAMPLE

Fiberoptic cable with 5 mm optical aperture:

| | |
|---|---|
| A - O.D. of sheath 17 | 12.5 mm |
| B - Thickness of sheath 17 | 2.5 mm |
| C - Length of strain-reliever 18 | 5.75 cm |
| D - Length of strain-reliever 18 between junctures 21, 22 | 5.0 cm |
| E - Wall thickness of 18 at thick end | 1.5 mm |
| F - Wall thickness of 18 at thin end | .75 mm |
| G - Length of short extension 25 | 7.5 mm |
| H - Length of 17 beyond extension 25 | 27.5 mm |
| I - Length of sleeve 24 | 42.5 mm |
| J - Wall Thickness of sleeve 24 | 1.0 mm |
| K - Length of housing 16 | 5.0 cm |
| L - Wall thickness of housing 16 | 2.0 mm |
| M - Length of sleeve 24 beyond sheath 17 | 5.0 mm |

| | |
|---|---|
| N - Length of housing 16 beyond sleeve 24 | 7.5 mm |
| Material of fibers 14 | glass |
| Material of sheath 17 | surgical rubber |
| Material of strain-reliever 18 | silicone rubber |
| Material of sleeve 24 | stainless steel |
| Material of housing 16 | molded acetal resin |
| Bonding resin 26 | epoxy |

The above is only a specific example and the various dimensions and thicknesses can be expected to vary within reasonable ranges. The other end of cable 10 can be expected to terminate with a similar assembly or any other assembly suited to the particular application.

While the invention has been described in accordance with a specific embodiment, some variations will be recognized as obvious by those skilled in the art and is intended to cover the invention within the full scope of the appended claims.

I claim:

1. A fiberoptic cable with integral strain-relieved termination comprising:
   a. an extended bundle of optical fibers, bonded and finished at at least one end;
   b. one tube of elastomeric material covering said bundle and terminating short of said one end;
   c. a second tube of elastomeric material having a length in the range of 4 to 16 centimeters covering and integrally bonded to said one tube, said second tube terminating proximate said one end but short of said one tube;
   d. a cylindrical sleeve overlapping and adhesively bonded to said one tube and a short portion of said second tube; and,
   e. a rigid housing mechanically secured to and enclosing the full length of said sleeve and providing an optical aperture at said one end.

2. A fiberoptic cable according to claim 1 wherein said cylindrical sleeve is metallic.

3. A fiberoptic cable according to claim 2 wherein said cylindrical sleeve is stainless steel and is adhesively bonded to said one tube and said second tube by an epoxy resin.

4. A fiberoptic cable according to claim 1 wherein said second tube tapers from a maximum thickness adjacent said housing to a minimum thickness away from said housing.

5. A fiberoptic cable according to claim 4 wherein said second tube commences prior to said housing and terminates inside said housing short of the termination of said one tube.

6. A fiberoptic cable according to claim 5 wherein said sleeve commences with said housing and terminates beyond the termination of said one tube.

7. A fiberoptic cable according to claim 1 wherein said housing is mechanically secured to said sleeve by a press-fit.

* * * * *